United States Patent [19]
Kerruish

[11] 3,785,592
[45] Jan. 15, 1974

[54] VTOL AIRCRAFT

[76] Inventor: Kermit D. Kerruish, 3546 Golddust St., Phoenix, Ariz.

[22] Filed: Oct. 4, 1971

[21] Appl. No.: 186,347

[52] U.S. Cl............ 244/12 C, 244/23 C, 244/34 A
[51] Int. Cl........................................... B64c 27/20
[58] Field of Search.............. 244/12 C, 12 A, 12 R, 244/12 D, 23 R, 23 C, 34 A, 17.11, 21

[56] References Cited
UNITED STATES PATENTS

| | | | |
|---|---|---|---|
| 2,014,051 | 9/1935 | Nishi | 244/23 C |
| 2,978,206 | 4/1961 | Johnson | 244/23 C |
| 3,041,009 | 6/1962 | Wharton | 244/12 C |
| 3,276,723 | 10/1966 | Miller et al. | 244/12 C |
| 3,405,889 | 10/1968 | Wagle | 244/12 C |
| 3,465,988 | 9/1969 | Orr | 244/12 R |
| 3,489,374 | 1/1970 | Morcom | 244/12 C |

Primary Examiner—Trygve M. Blix
Assistant Examiner—Barry L. Kelmachter
Attorney—Allen E. Botney

[57] ABSTRACT

The present invention provides a vertical takeoff and landing aircraft vehicle in which a ducted downward airflow is redirected radially outward over an annular wing. The transition from the vertical to the horizontal flight mode is made by selectively closing off portions of the airflow exiting from the duct toward the wing. This is accomplished by means of flaps which are gradually closed on the forward side of the aircraft resulting in a net thrust forward due to the predominantly rearward flowing air.

2 Claims, 4 Drawing Figures

PATENTED JAN 15 1974　　3,785,592

INVENTOR
KERMIT D. KERRUISH
BY Allen E. Botney
ATTORNEY

VTOL AIRCRAFT

The present invention relates to aircraft in general and more particularly relates to aircraft that are adapted to take off and land substantially vertically.

In general terms, the invention teaches an aircraft of the VTOL (vertical take-off and landing) type having generally radial symmetry about a vertical principal axis. Propeller means operate within a shaped duct structure that is coaxial with said principal axis in order to draw air downward into the duct. Downstream of this propeller means, the duct is shaped so as to direct the air flow in a generally radial outward direction over an annular wing-like structure. In addition, the downstream end of the duct is provided with peripheral segment flap means for selectively reducing or closing the efflux of air over corresponding radial segments of the wing-like structure. The outer periphery of this wing-like structure is optionally provided with lift-augmenting Fowler-type flaps, aerodynamic trimming flaps and aerodynamic attitude control means. In its vertical mode of operation, air is caused by the propeller means to flow generally downward through the duct, from which it is directed generally outward over both the upper and the lower surfaces of the wing-like structure, thereby generating the desired vertical lift. To obtain horizontal motion, one or more of the selectively controllable peripheral flaps at the duct efflux are partly or completely closed, the resulting radial asymmetry of the air flow thereby causing a new horizontal thrust. An aerodynamic trimming flap compensates for the pitch down movement in horizontal flight and maintains a positive angle of attack for the wing-like structure.

VTOL vehicles are disclosed in the prior art but the present invention can be distinguished over them. More particularly, from the view point of general structural concept, VTOL vehicles fall into either of two main categories, namely, those exhibiting pronounced symmetry with regard to a preferred horizontal direction of flight and those exhibiting pronounced symmetry about a vertical axis. The present invention falls into the second abovesaid structural category. Within this main category, however, a further distinction can be drawn between the prior art and the present invention according to the means employed to generate vertical life in the absence of any horizontal component of motion. In a first sub-category, lift in the vehicles is generated directly by imparting a downward acceleration to a gas flow. Examples of vehicles in this first sub-category are disclosed in E. E. Slaughter, "Vertical Rise Aircraft", U.S. Pat. No. 3,123,320, issued Mar. 3, 1964; R.A. Lemberger, "VTOL Aircraft", U.S. Pat. No. 3,182,929, issued May 11, 1965; and G. R. McGuiness, "Aircraft, Especially VTOL Type", U.S. Pat. No. 3,514,053, issued May 26, 1970. The present invention, on the other hand, belongs in a second sub-category of vehicles in which lift is generated by first accelerating an air stream by suitable propeller means and subsequently causing such air stream to interact aerodynamically with at least one wing-like structure.

For the purpose of distinguishing the present invention from the prior art still further, the above-identified second sub-category is, for sake of clarity and convenience, divided into three sections that will be separately discussed hereinbelow. Examples of the first section are D. S. Johnson, "Radial Flow Lift Device", U.S. Pat. No. 2,978,206, issued Apr. 4, 1961; Williams Wharton, "Aircraft", U.S. Pat. No. 3,041,009, issued June 26, 1962; and J. A. Wagle, "Vertical Lift Vehicle", U. S. Pat. No. 3,405,889, issued Oct. 15, 1968. All three examples are distinguished from the present invention by the common characteristic that they have, namely, the lift-generating air flow in them is specified to occur only over the upper surface of the wing-like structure. See, for example, in Johnson, column 6, lines 69–71; in Wharton, column 2, lines 51–53; and in Wagle, column 3, lines 4–6. As regards the prior art in this first section, therefore, the present invention is distinguishable over it by explicitly teaching air flow over the lower surface of the wing-like generating structure as well as its upper surface. It will be recognized by those skilled in the art that the air flow taught by the present invention and the manner in which said air flow is implemented is a much more efficient way of generating lift given the same wing-like structure and the same power input than an air flow over the upper surface of the wing-like structure only, as is taught in the prior art.

A second section of prior art is represented by P. J. Morcom, "Air-Ground Vehicle". U.S. Pat. No. 3,489,374, issued Jan. 13, 1970. There are two substantive distinctions that can be made in comparing the present invention with the prior art in this second section as represented by Morcom. First, Morcom specifies at least two annular wing-like structures, such that air flow in Morcom is downward and inward over the upper airfoil, thence generally downward through propeller means, and then downward and outward over the lower airfoil. On the contrary, the present invention specifies only one major airfoil downstream of the propeller means. Second, Morcom specifies a set of pivotally mounted louvers below his second (lower) airfoil to generate a horizontal thrust, whereas, in the present invention, radially outward airflow is selectively restricted or closed off over the single major airfoil for the same purpose. Stated differently, Morcom employs pivoting louvers to deflect an otherwise vertically downward-directed air stream and to generate thereby thrust in a horizontal direction. In contrast, the present invention employs entirely different means for generating its horizontal thrust.

The third section of prior art is exemplified by J. W. Miller, et al., "VTOL Flight Unit", U.S. Pat. No. 3,276,723, issued Oct. 4, 1966. A basic difference exists, however, between the present invention and the Miller invention in the manner in which they perform the transition maneuver between the vertical and horizontal flight modes and, closely related thereto, the attitude of the respective vehicles when in horizontal flight. More particularly, referring to FIG. 1 in Miller and to column 7, lines 11–28 therein, Miller proposes to use elevons that are controllably moved in and out of the air stream so as to tilt the entire vehicle. The transition maneuver according to Miller is best understood by its very close analogy to the transition and horizontal flight of a helicopter. In both cases, an air stream generates vertical lift although, in the case of the helicopter, no aerodynamic lifting surface other than the rotor blades are employed. The thrust generated by such air flow is always coaxial with the vertical symmetry axis of the vehicle. In order to generate horizontal motion, means are therefore employed (elevons in the case of Miller and cyclically variable blade pitch in the case of a helicopter) to tilt the entire vehicle axes toward the desired direction of horizontal flight. In other words, the flight behavior of a vehicle according to Miller resembles, as to attitude, a helicopter. However, an important difference between a vehicle according to Miller and a helicopter is that Miller teaches both a rigid aerodynamic structure and a forward tilt of the entire structure in order to achieve forward motion by thrust vectoring, with the result that the external surfaces of the Miller vehicle must exhibit a negative angle-of-attack when in forward flight. Consequently, the vehicle taught by Miller experiences a necessary loss of vertical lift, a condition that worsens with increasing forward flight velocity.

In contrast, the present invention produces a gain in aerodynamic lift with increasing forward flight velocity, the reason being that within the general duct exit area, hinged flap means are provided which may be operated selectively to restrict or to completely close off one or more peripheral sectors of the duct exit. Whereas in the vertical mode the air flow is uniformly outward in every direction over the lift-generating surface, the use of such flap means to restrict air flow over one peripheral sector of the airfoil results in reduced air flow over that sector and a correspondingly increased air flow over the segments of the airfoil not so restricted. In consequence, thereof, an unbalanced radial thrust is obtained which produces forward motion of the vehicle in the direction of the restricted segment of the duct exit. As the vehicle gains forward velocity, an aerodynamic lift in balance will necessarily develop for the reason that forward of the center of the vehicle, the radial outflow of air is opposed by the external air flow, while rearward of the center the radial air outflow combines with the external air flow. There is, therefore, a loss of lift on the forward portion of the airfoil and a gain of lift on the rearward portion. However, in accordance with the present invention, the resulting pitch-down moment is compensated by a separately actuated trimming airfoil which permits the vehicle to maintain a positive angle-of-attack for the annular airfoil taken as a whole. Thus, contrary to the vehicle taught by Miller, a vehicle according to the present invention gains lift with increasing forward velocity, as stated above.

For the sake of clarity, the contrast between the essential elements of the present invention and those in the prior art are summarized hereinbelow, as follows.

1. In the present invention, propeller means induces air flow over both upper and lower surfaces of an annular wing-like structure downstream of the propeller means. This eliminates Slaughter, Lemberger and McGuiness through the use of a lift-generating airfoil in place of the direct downward thrust of an air flow; Johnson, Wharton and Wagle through use of air flow over both upper and lower surfaces of said airfoil; and Morcom through omission of an inherently deleterious airfoil up stream of the propeller means.

2. In the present invention, selectively operable flap means reduce or close one or several peripheral segments of the propeller duct efflux so as to reduce or eliminate air flow over one or several radial segments of the annular airfoil, thereby generating horizontal thrust. The resultant pitch-down moment is compensated with a separately controllable trimming airfoil. This eliminates Miller, et al., since the Miller vehicle axis tilts forward (negative angle-of-attack) in forward flight.

It is, therefore an object of the present invention to provide a VTOL aircraft vehicle having new and improved means therewith for creating a combination of different lifting and propelling forces that will sustain vertical and horizontal flight modes in an effective manner.

It is another object of the present invention to provide a VTOL aircraft vehicle having a new and improved control assembly therein for controlling the attitude of the vehicle in forward flight.

It is a further object of the present invention to provide a new and improved VTOL aircraft vehicle in which the air flow is directed downwardly through a duct and thereafter redirected radially outward over an annular wing.

It is an additional object of the present invention to provide a new and improved VTOL aircraft vehicle in which a transition from the vertical to the horizontal flight modes is obtained by selectively closing off portions of the forwardly directed air flow.

It is still another object of the present invention to provide a new and improved VTOL aircraft vehicle that can maintain a positive angle-of-attack during forward flight.

It is another and further object of the present invention to provide a new and improved VTOL aircraft vehicle in which a separately controllable trimming airfoil compensates for the normal pitch-down moment thereof.

The novel features which are believed to be characteristic of the invention, both as to its organization and method of operation, together with further objects and advantages thereof, will be better understood from the following description considered in connection with the accompanying drawings in which an embodiment of the invention is illustrated by way of example. It is to be expressly understood, however, that the drawings are for the purpose of illustration and description only and are not intended as a definition of the limits of the invention.

Figure 1:
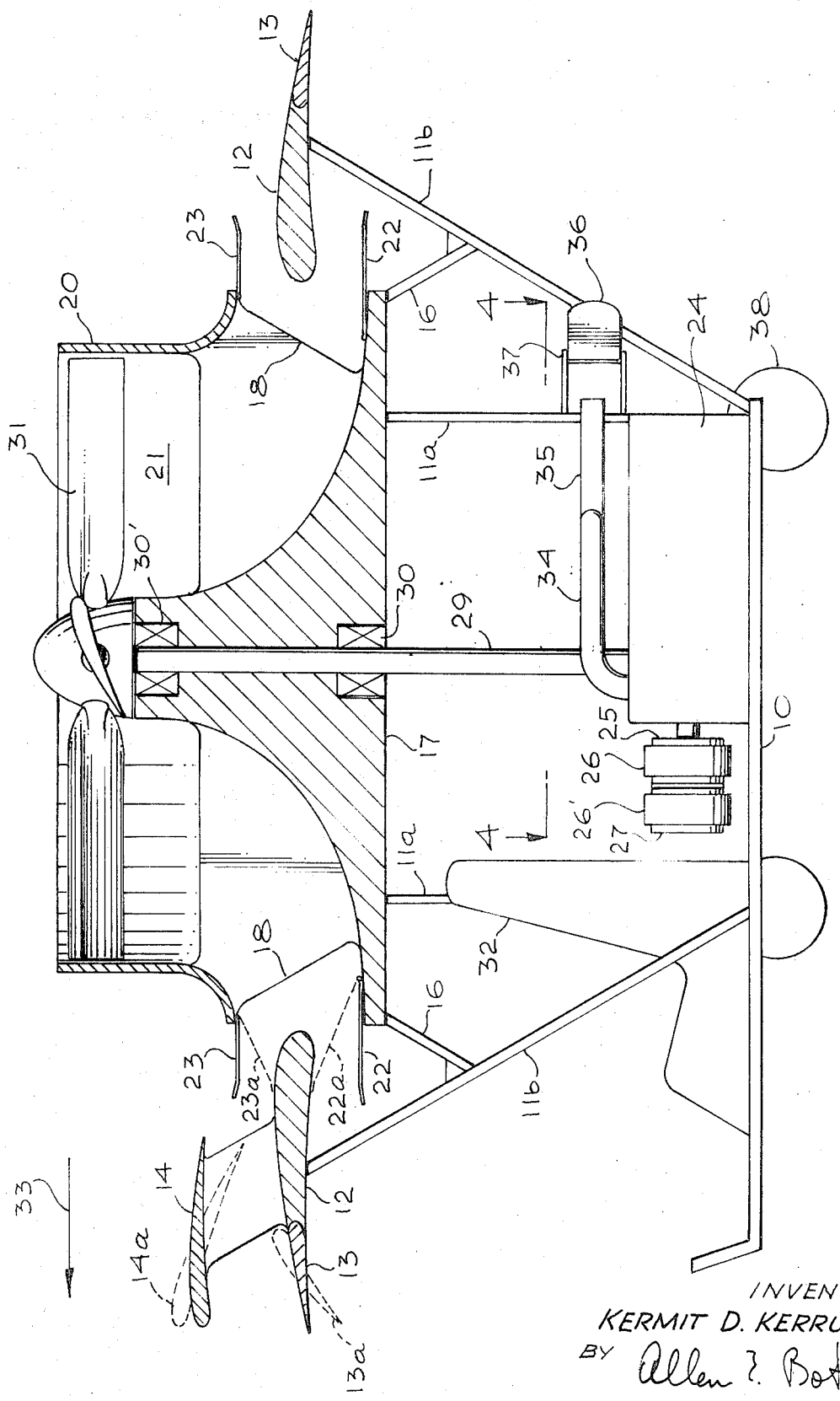
FIG. 1 is a side view, partly in cross-section, of an embodiment of a VTOL aircraft vehicle according to the present invention.
Figure 2:
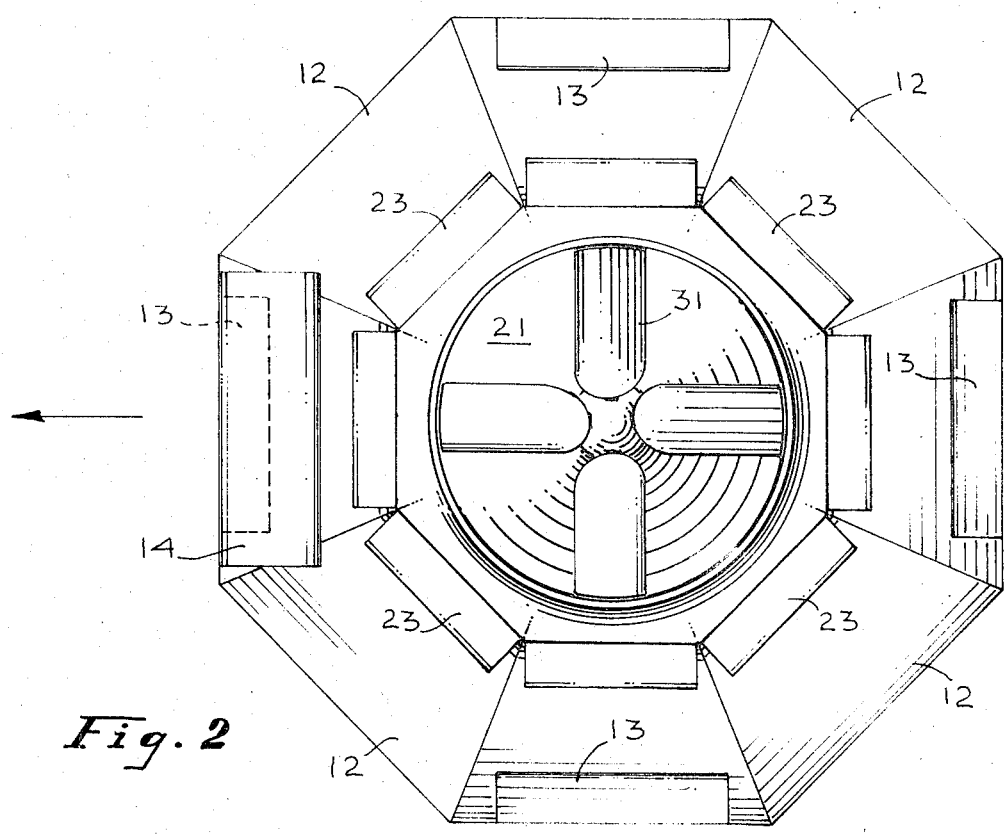
FIG. 2 is a top view of the FIG. 1 embodiment.
Figure 3:
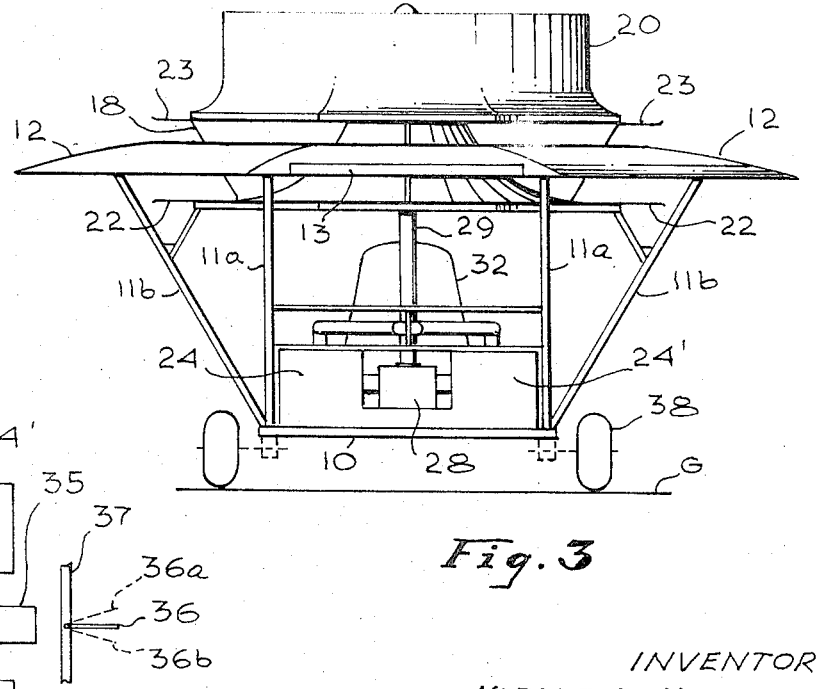
FIG. 3 is a rear view of the FIG. 1 embodiment.

For a consideration of the invention in detail, reference is now made to the drawings wherein, from FIGS. 1, 2 and 3, it can be seen that an embodiment of the present invention basically includes a platform 10 which, by means of struts 11a and 11b, supports an annular wing 12. While ideally the wing should have radial symmetry about its vertical axis, for practical considerations, namely, manufacturing and assembly convenience, the ideal shape is approximated by segments forming a polygon, for example an octagon, as shown in the figures. Some of the abovesaid wing segments have flaps 13 which are preferably mounted to form an extension of the profile of wing 12. However, as will be recognized by those skilled in the art, one or more of these flaps may be selectively extended, as is schematically indicated by the broken-line formation of flap 13a. Finally, at least one of the wing segments also supports a trimming airfoil 14 that is located and held in position by means of support member 15. Airfoil 14 is mounted so that it may be tilted, as is illustrated by the airfoil 14a shown in broken lines.

An additional set of struts 16 supports a central core member 17 whose configuration generally resembles the shape of a bell, the lower perimeter of the core member preferably being a polygon generally corresponding to, that is to say, similar to the polygon formed by wing segment 12. Vane-like supports 18 support and maintain a shell-type structure 20 in a coaxially shaped relationship to core member 17, thereby forming an annular-shaped duct between them that is generally designated 21. Shell 20 has a circular perimeter at its top edge, transitioning to a polygonal perimeter at its bottom edge that is similar to the other aforesaid polygons. Hinged-flaps 22 are attached to segments of core member 17 that may be selectively rotated, as is schematically indicated at 22a. Likewise, hinged-flaps 23 are attached to the segments of shell 20 and they may also be selectively rotated, as is schematically indicated at 23a.

Figure 4:
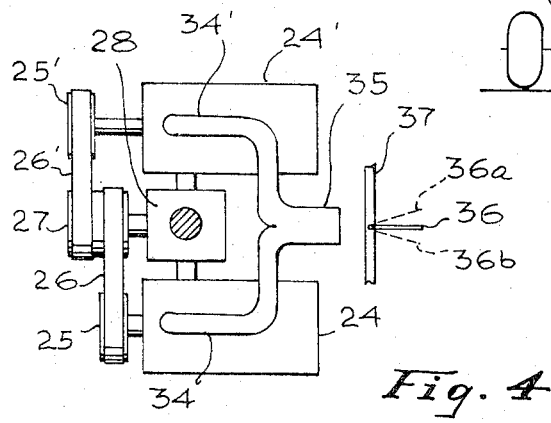
FIG. 4 is a partial top view of the FIG. 1 embodiment taken in the direction of the arrows designated 4—4.

Referring now to FIG. 4 as well as FIGS. 1 and 3, platform 10 supports a power plant mounted thereon, the power plant including two internal combustion engines, generally designated 24 and 24', which transmit power through a pair of sheaves 25 and 25' (the sheaves may contain over-running clutches), a pair of V-belts 26 and 26', twin sheave 27, a right-angle gear box 28 and propeller shaft 29 (the propeller shaft may be supported, for example, on bearings 30 and 30') to propeller 31. Platform 10 also includes a support for the pilot of the vehicle, generally designated 32, who is thereby positioned to face forward in horizontal flight, arrow 33 indicating the direction of forward flight for the vehicle being described. Exhaust manifolds 34 and 34' of internal combustion engines 24 and 24', respectively, may be jointed to form an exhaust duct 35, the axis of which is preferably co-planar with hinged rudder 36 supported on struts 37. For purposes that will become more readily apparent below, hinged rudder 36 may be selectively rotated into positions 36a and 36b shown in FIG. 4. The details of instruments, controls and control linkages are omitted herein since suitable designs for them are readily available and generally well known in the art. Accordingly, a showing and description of them are not deemed necessary.

It should finally be mentioned that the craft may be supported above ground G by a set of wheels 38.

The operation of an embodiment according to the present invention may best be explained by describing the cooperative functioning of its various components during three distinctive phases of flight, namely, vertical take-off, transition to horizontal flight and horizontal flight. In this regard, it will readily be understood by those skilled in the art that the transition from the horizontal to the vertical phase(descent) as well as vertical descent and landing, is performed in an analogous manner.

Thus, with engines 24 and 24' running, propeller 31 impels ambient air to flow downward and through duct 21, and from thence radially outward over wing segments 12, thereby generating the desired vertical lift. Lift augmentation may be obtained by extending flaps 13 to position 13a. Hinged flaps 22 and 23 are in the positions shown, permitting an unrestricted radial outflow of the air emanating from duct 21. In the vertical flight phase, lift is controlled both by the engine power output (throttle) and the position of flaps 13. Pitch and roll are controlled by selectively extending or retracting the appropriate individual flaps 13, thereby increasing or reducing the lift at selected wing segments and generating the appropriate turning or restoring torques. Yaw is controlled by turning hinged rudder 36, thereby causing the exhaust of engines 24 and 24' to impinge preferentially on one side or the other of rudder 36 to generate an appropriate yaw torque.

Transition to horizontal flight is initiated by selectively rotating hinged flaps 22 and/or 23 so as to selectively restrict the air flowing radially outward from duct 21 from flowing over selected wing segments 12. In particular, for transition into forward horizontal flight, hinged flaps 22 and/or 23 are actuated so as to restrict the air flow over the forward segment of wing 12, this being accomplished, as shown in FIG. 1, by moving flaps 22 and/or 23 into positions 22a and/or 23a, respectively. Whereas in vertical flight and the radially outward air flow is symmetrical in all directions and, therefore, balanced, selective restriction of the forward-directed air flow causes a reduction of forward air thrust and a corresponding increase in rearward air thrust, thereby imparting forward momentum to the craft.

As the aircraft begins to gain forward air speed, the general flow of ambient air over wing segments 12 opposes the forward-directed flow of air from duct 21 and augments the rearward-directed flow of air from duct 21. As is well known, this tends to generate a loss of lift over the forward wing segments 12 and to produce a gain of lift over the rearward wing segments 12. If uncompensated, the craft would therefore exhibit a pitch-down moment. Trimming foil 14 is therefore rotated to the position 14a in order to offset the pitch-down moment and maintain the desired craft attitude in pitch.

It is important to note that the entire craft may be maintained in a slightly nose-up attitude during horizontal flight. In such a situation, the entire annular wing structure formed of wing segments 12 acts as an airfoil with a generally positive angle-of-attack and, therefore, contributes to vertical lift increasingly with increasing air speed.

While the immediately preceeding description has related generally to means for initiating and maintaining thrust in a forward flight direction, the embodiment described herein is also suitable for generating thrust in a rearward or transverse direction by selectively actuating hinged flaps 22 and/or 23. As will be evident to those experienced in the art, this capability is particularly desirable for precision landings in the vertical mode. Yet another feature of the present invention is that vertical take-off and landing is not mandatory. On the contrary, a craft according to the present invention can perform take-off and landing in a conventional manner merely by using hinged flaps 22 and/or 23 to partially or entirely close off the forward air flow from duct 21, thereby generating a forward thrust. Ultimately, the combination of radial outward air flow and external air flow over wing segments 12 will generate sufficient lift for rotation and climb.

Although a particular arrangement of the invention has been illustrated and described above by way of example, it is not intended that the invention be limited thereto. Accordingly, the invention should be considered to include any and all modifications, alterations or equivalent arrangements falling within the scope of the annexed claims.

Having thus desribed the invention, what is claimed is:

1. An aircraft adapted for substantially vertical takeoff and landing, said aircraft comprising: means forming an annular-shaped duct for directing air flowing therein to flow downward and then radially outward in a horizontal direction, said means including propeller apparatus mounted at the upper end of said duct for forcing ambient air into and through it; an annular-shaped wing structure mounted concentrically with said annular-shaped duct and in the path of the air flowing radially outward therefrom, the air passing over said wing structure generating vertical lifting forces thereon; an engine for operating said propeller apparatus; first and second horizontal thrust-producing devices respectively mounted on the front and rear ends of the aircraft in proximity to said duct and wing, said devices being separately operable to selectively close off the front and rear ends of said duct to selectively prevent the air therefrom from passing over the segments of the wing in the vicinity thereof, thereby to selectively produce forward and backward motion, said first and second devices each including a pair of hinged flaps that may be rotated toward its associated wing segment until it is contiguous thereto, thereby preventing the air flowing out of said duct from passing over said segment; and a rudder mounted to the rear of the exhaust of said engine.

2. The aircraft defined in claim 1 wherein said aircraft further includes a trimming airfoil member tiltably mounted above the forward segment of said wing structure and out of the direct path of the air flowing out of said duct, said member being adapted to increase the lift of the forward end of the aircraft when it is in forward flight; and wherein said first and second devices each includes a pair of hinged flaps that may be rotated into contact with its associated wing segment, thereby to prevent the air flowing out of said duct from passing over said segment.

* * * * *